H. E. CHURCH & W. V. COWDEN.
WINDOW BEAD FASTENER AND THE LIKE.
APPLICATION FILED OCT. 22, 1910.

979,430.

Patented Dec. 27, 1910.

Witnesses
W. E. Allen.
C. B. Bull

Inventors
Herbert E. Church.
Walter V. Cowden.
By Walter Allen
Attorney

UNITED STATES PATENT OFFICE.

HERBERT E. CHURCH AND WALTER V. COWDEN, OF AFTON, NEW YORK.

WINDOW-BEAD FASTENER AND THE LIKE.

979,430.  Specification of Letters Patent. Patented Dec. 27, 1910.

Application filed October 22, 1910. Serial No. 588,429.

*To all whom it may concern:*

Be it known that we, HERBERT E. CHURCH and WALTER V. COWDEN, citizens of the United States of America, and residents of Afton, in the county of Chenango and State of New York, have invented certain new and useful Improvements in Window-Bead Fasteners and the Like, of which the following is a specification.

Our invention while devised and shown in this application as a window bead fastener is equally applicable as a fastener for coffin tops, knockdown furniture, and other articles which require for esthetic reasons a fastener which besides being secure, is removable without marring the adjacent structure and ornamental rather than disfiguring when in place.

The object of our invention is to produce a fastener which is easily applied, is adjustable, is ornamental and which can be removed and replaced without changing or injuring the finish of the structure to which it is applied.

Figure 1:
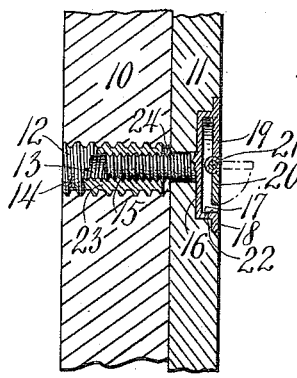
Figure 2:
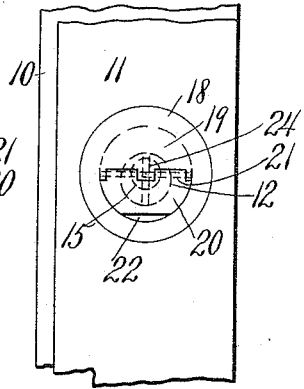
Figure 3:
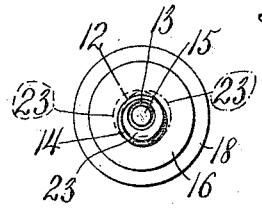
Figure 4:
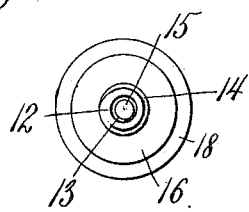
Figure 5:
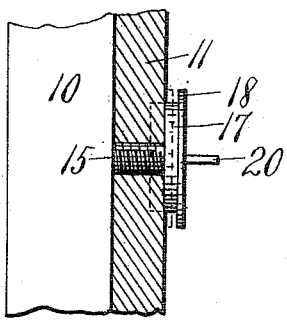

In the drawings Figure 1 is a vertical section through a part of a window frame and bead and our fastener which is shown in connection therewith. Fig. 2 is an elevation of a part of a window frame and bead and our fastener which is shown in connection therewith. Fig. 3 is a rear view of our fastener showing an adjustable socket. Fig. 4 is a rear view of our fastener showing a non-adjustable socket. Fig. 5 is a vertical section through a part of a window frame and bead showing our fastener applied thereto without countersinking the head thereof.

10 is the window frame, 11 the window or sash bead and 12 an adjustable socket screwed into a hole which has been previously prepared for it in the frame, the socket having an interiorly screw threaded hole or bore 13 and an exterior screw thread 14, the exterior screw thread 14 engaging the inner surface of the hole in the frame.

15 is an exteriorly screw threaded shank formed integral with or rigidly attached to the base plate 16 which, with an integral circumferential flange 17 extending perpendicularly or upwardly from the base plate 16 and with a radial outturned integral flange 18 extending perpendicularly or outwardly from flange 17 and in a plane parallel with base plate 16, comprises the head of the fastener part of our invention.

Seated in the recess formed by the plate 16, flange 17 and surrounding flange 18 is a fixed half cover 19 formed integral with or rigidly attached to the base plate 16, flange 17 or flange 18. To this fixed half cover 19 is hinged a second or movable half cover 20 the pivot 21 allowing of the movable half cover 20 swinging outward so as to be used as a handle for turning the fastener in the socket, the movable half cover 20 being cut away at 22 to permit a finger tip or other instrument to be inserted under the cover to turn it outward into operative position, which is shown in dotted lines in Fig. 1.

The socket 12 is bored eccentrically so that one side is thicker at 23 than the other side. This allows of vertical or horizontal adjustment of the window bead with relation to the window frame. One end of the socket is also slotted so that the socket may be screwed into place with a screw driver. It is not necessary that the socket should be made with an eccentrically bored hole. If it is not desired to have the device adjustable vertically or laterally the hole may be bored centrally producing a socket, as indicated in Fig. 4. It is not necessary that the fastener should be countersunk entirely. It may be countersunk sufficiently to permit the thickness of the flange 18 being shown in relief for its ornamental value as indicated in dotted lines in Fig. 5 or not countersunk at all as shown in full lines in Fig. 5, so that the flanges 17 and 18 may serve as a retainer for straps or like devices, especially supporting-loops in carriages, without departing from the spirit of our invention, which contemplates the use of the fastener and socket broadly and wherever applicable.

In applying the frame is bored and the socket screwed in flush with the outer surface of the frame. A hole is bored in the bead sufficiently large to take the shank 15 and, if it is desired to countersink the head, larger borings of the diameter of the flanges 17 and 18 are previously made. The fastener is then screwed in place by means of the movable half cover and when adjustment is desired owing to the after shrinkage of the wood, the socket may be turned sufficient of a revolution to cause the bead to be shifted in or out, up or down, as needed. The socket is intended to fit tight in the frame, while the shank 15 is intended to have a smooth fit in the bead. When the movable half cover is turned down into place there is a flush surface in the case of the countersunk head and no corners to catch in the case of the non-countersunk head.

Having thus described our invention the following is what we claim as new therein and desire to secure by Letters Patent:

1. A fastener of the character described comprising a screw threaded shank having a plate formed with a fixed half cover, and a movable half cover hinged to the fixed half cover so as to provide a folding handle for turning the shank.

2. A fastener of the character described comprising a screw threaded shank having a base plate formed with a circumferential flange and a fixed half cover, and a movable half cover hinged to the fixed half cover so as to provide a folding handle for turning the shank.

3. A fastener of the character described comprising a screw threaded shank having a base plate formed with a circumferential flange, with a radial outturned flange and with a fixed half cover and a movable half cover hinged to the fixed half cover so as to provide a folding handle for turning the shank.

4. A fastener of the character described comprising a socket having an interiorly screw-threaded hole, a screw-threaded shank adjustable in the hole of the socket, and having a base plate formed with a circumferential flange and with a fixed half cover, and a movable half cover hinged to the fixed half cover so as to provide a folding handle for turning the shank.

5. A fastener of the character described comprising a socket having an interiorly screw-threaded eccentric hole, a screw-threaded shank, adjustable in the hole of the socket, and having a base plate formed with a circumferential flange, and with a fixed half cover, and a movable half cover hinged to the fixed half cover so as to provide a folding handle for turning the shank.

HERBERT E. CHURCH.
WALTER V. COWDEN.

Witnesses:
   T. D. REED,
   W. McHUGH.